United States Patent Office 3,274,194
Patented Sept. 20, 1966

3,274,194
QUINAZOLINEDIONE DERIVATIVES
Shin Hayao, Elkhart, Ind., assignor to Miles Laboratories, Inc., Elkhart, Ind., a corporation of Indiana
No Drawing. Filed Mar. 29, 1963, Ser. No. 269,168
6 Claims. (Cl. 260—256.4)

This invention relates to novel quinazolinedione derivatives. In one of its more particular aspects this invention relates to 3 - substituted 2,4(1H,3H)-quinazolinediones and to novel methods for the preparation thereof.

The quinazolinedione derivatives of the invention may be represented by the following general formula:

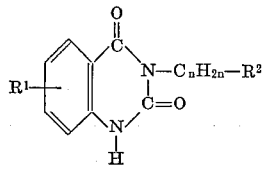

In this formula $R^1$ represents one or more groups such as hydrogen, halogen, lower alkyl, lower alkoxy, nitro and amino, $n$ equals 0 to 6 inclusive and $R^2$ represents di-lower alkylamino or a heterocyclic radical. The heterocyclic radical may be substituted or unsubstituted and may contain one or more heterocyclic nitrogen atoms. For example, in an especially preferred sub-group of compounds, $R^2$ may represent 4-aryl-1-piperazyl and the corresponding radicals in which aryl is a substituted phenyl radical.

The compounds of this invention may be conveniently prepared by reacting the corresponding o-aminobenzamides in a suitable solvent with phosgene or with ethyl chloroformate. The o-aminobenzamides used as the starting materials may be conveniently prepared from a primary amine and isatoic anhydride or a substituted derivative thereof. These preparations may be illustrated by means of the following sequence of equations:

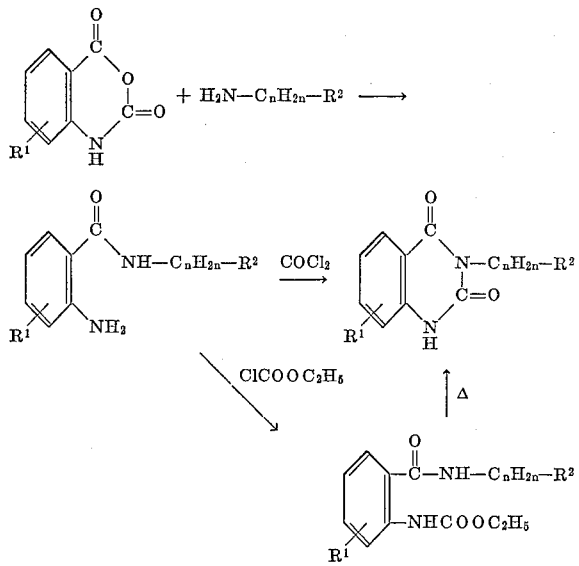

wherein $R^1$, $R^2$ and $n$ have the same significance as above.

The reaction of a primary amine with isatoic anhydride is a general one for the preparation of o-aminobenzamides, and is described by R. H. Clark and E. C. Wagner, J. Org. Chem. 9, 55 (1944). The cyclization of the o-aminobenzamide with phosgene may be achieved by passing phosgene into a solution of the benzamide in a suitable solvent at the boiling point of the solvent. An especially preferred method makes use of boiling chlorobenzene as the solvent. Other solvents which may be used for this purpose include, for example, acetic acid.

The carbethoxylation of the primary aromatic amino group may be readily accomplished by reaction of the benzamide with ethyl chloroformate followed by heating the resulting ethoxycarbamoyl salt to a temperature above its melting point to effect cyclization to the desired quinazolinedione. For the carbethoxylation the use of a suitable solvent for the benzamide such as chlorobenzene is recommended. Other solvents which may be used include tetrahydro furan and chloroform, for example. The quinazolinediones prepared according to the foregoing reaction scheme may be isolated as crystalline salts such as the hydrochlorides or other suitable acid salts.

The compounds of this invention are useful as anti-inflammatory agents and sedatives.

This invention will be better understood by reference to the following examples which are included for purposes of illustration and are not to be construed as in any way limiting the scope of this invention which is defined in the claims appended hereto.

EXAMPLE 1

3-(4-phenyl-1-piperazyl)-2,4(1H,3H)-quinazolinedione

A. 1-(o-AMINOBENZAMIDO)-4-PHENYLPIPERAZINE

A mixture of 1-amino-4-phenylpiperazine (63.5 g., 0.39 mole) and isatoic anhydride (58.1 g., 0.39 mole) gave a brown liquid with evolution of carbon dioxide and then became a solid mass in a few minutes. It was heated on a steam bath for an hour and the light tan solid was recrystallized from aqueous dimethylformamide (DMF) and decolorized with charcoal to give a light tan crystalline solid which was collected by suction and washed with ether, yield 79.7 g. (69.1%), M.P. 202–203°. A sample was recrystallized from aqueous DMF to give a buff-colored solid of M.P. 201–203°. (Note: All temperatures are expressed as degrees centigrade unless otherwise indicated.)

Analysis.—Calcd. for $C_{17}H_{20}N_4O$: N, 18.9. Found: N, 19.2.

B. 3-(4-PHENYL-1-PIPERAZYL)-2,4(1H,3H)-QUINAZO-
LINEDIONE-DIHYDROCHLORIDE

To a boiling solution of 1-(o-aminobenzamido)-4-phenylpiperazine (29.6 g., 0.1 mole) in 250 ml. of chlorobenzene was introduced a slow stream of phosgene with vigorous stirring during 45 minutes to give a light tan gummy solid. The reaction mixture was cooled in an ice-water bath and the solid was collected on a filter. It was washed with ethyl acetate and dried in air, yield 37.6 g., M.P. 250–260° (dec.), darkening beginning at ca. 240°. It was suspended in aqueous methanolic DMF and dry hydrogen chloride was bubbled in to give a clear solution which was filtered and again saturated with dry hydrogen chloride to cause separation of a colorless solid. Ethyl acetate was added to the hot mixture and the solid was collected by suction, yield 24.0 g., M.P.>260°.

Analysis.—Calcd. for $C_{18}H_{18}N_4O_2\cdot2HCl$: N, 14.2. Found: N, 14.2.

EXAMPLE 2

3-(2-pyridyl)-2,4(1H,3H)-quinazolinedione

A. 3-(2-PYRIDYL)-2,4(1H,3H)-QUINAZOLINEDIONE

To a boiling solution of 2-(o-aminobenzamido)pyridine (53.1 g., 0.25 mole) prepared according to the method of Clark and Wagner in 250 ml. of chlorobenzene was bubbled in a slow stream of phosgene during 50 minutes to give a yellow solid. The mixture was stirred under reflux for another 60 minutes and then cooled in an ice-water bath. The yellow solid was broken up and collected on a filter, yield 56.7 g., M.P. 210–220°. It was dissolved in hot aqueous methanol and saturated with dry hydrogen chloride to give a pale yellow solid which was collected, washed wits ethyl acetate and dried in air, yield 48.0 g., M.P. 220–225°. It was recrystallized again to give a colorless solid of M.P. 215–219° (dec.), yield 44.2 g. It was dissolved in water and made basic with ammonium hydroxide to give a colorless solid of M.P. 180–200°, yield 33.2 g. It was recrystallized from aqueous DMF-methanol to give a light tan crystalline solid of M.P. 132–134°, yield 12.0 g. (22.5% recovery of the starting material). The mother liquor was evaporated to dryness in vacuo to give a colorless solid mass which was recrystallized from aqueous DMF to give a crystalline solid of M.P.>260°, yield 16.8 g. (28%).

$\nu_{max.}^{KCl}$ 1750 and 1680 cm.$^{-1}$ (imide carbonyls), no amide II band.

*Analysis.*—Calcd. for $C_{13}H_9N_3O_2$: N, 17.6. Found: N, 17.6.

B. 3-(2-PYRIDYL)-2,4(1H,3H)-QUINAZOLINEDIONE HYDROCHLORIDE

The free base was dissolved in hot methanol-DMF and then saturated with dry hydrogen chloride to give a hot clear solution which was diluted with ether to give a colorless hydrochloride of M.P. >260°, yield 14.4 g.

*Analysis.*—Calcd. for $C_{13}H_{10}ClN_3O_2$: HCl, 13.2. Found: HCl, 13.0.

EXAMPLE 3

*3-[2-(4-phenyl-1-piperazyl)ethyl]-2,4(1H,3H)-quinazolinedione*

A. 1-[2(o-AMINOBENZAMIDO)ETHYL]-4-PHENYLPIPERAZINE

A mixture of 1-(2 - aminoethyl) - 4-phenylpiperazine (41.0 g., 0.2 mole) and isatoic anhydride (29.8 g., 0.2 mole) was heated on a steam bath for an hour to give a solid mass. It was recrystallized from aqueous DMF (carbon) to give a light tan solid of M.P. 139–142°, yield 51.2 g. (79%). A sample was twice recrystallized from aqueous acetone to give shiny plates of M.P. 141–142°.

*Analysis.*—Calcd. for $C_{19}H_{24}N_4O$: N, 17.3. Found: N, 17.5.

B. 3-[2-(4-PHENYL-1-PIPERAZYL)ETHYL]-2,4(1H,3H)-QUINAZOLINEDIONE HYDROCHLORIDE

To a boiling solution of the above amine (48.0 g., 0.15 mole) in 250 ml. chlorobenzene was introduced a slow stream of phosgene during 60 min. with vigorous stirring. The reaction mixture was cooled in an ice-water bath and the solid was collected on a filter, washed with ethyl acetate-ether and dried in air, yield 49.9 g., M.P. >270°. It was recrystallized twice from aqueous methanol-DMF to give a colorless crystalline solid which did not melt up to 260°.

*Analysis.*—Calcd. for $C_{20}H_{23}ClN_4O_2$: N, 14.5. Found: N, 14.5.

C. 3-[2-(4-PHENYL-1-PIPERAZYL)ETHYL]-2,4(1H,3H)-QUINAZOLINEDIONE

The filtrate was concentrated in vacuo to leave a dark brown syrup which solidified on cooling. It was treated with sodium hydroxide solution to give a light tan gum which slowly solidified. It was recrystallized three times from aqueous DMF to give a pure free base of M.P. 240–243°.

*Analysis.*—Calcd. for $C_{20}H_{22}N_4O_2$: N, 16.0. Found: N, 16.0.

EXAMPLE 4

*3-[3-(4-phenyl-1-piperazyl)propyl]-2,4(1H,3H)-quinazolinedione*

A. 1-PHENYL-4-[3-(o-AMINOBENZAMIDO)PROPYL]PIPERAZINE

A mixture of 1-(3-aminopropyl)-4-phenylpiperazine (67.5 g., 0.31 mole) and isatoic anhydride (50.3 g., 0.31 mole) was heated at 200–210° in a wax bath for 3 hours to give a dark melt which solidified on standing. It was distilled to give a light amber viscous liquid of B.P. 240–269° (0.7–0.32 mm.), yield 96.8 g. (92.8%). It was dissolved in hot methanol and water was added to give an oil which soon solidified on seeding and scratching. It was recrystallized from aqueous ethanol to give an analytical sample of M.P. 121–123°.

*Analysis.*—Calcd. for $C_{20}H_{26}N_4O$: N, 16.6. Found: N, 16.5, 16.6.

B. 3-[3-(4 - PHENYL-1-PIPERAZYL)PROPYL]-2,4(1H,3H)-QUINAZOLINEDIONE DIHYDROCHLORIDE MONOHYDRATE

To a boiling solution of the above amine (33.8 g., 0.1 mole) in 300 ml. of chlorobenzene was bubbled in phosgene with vigorous stirring for 30 min. The solution became cloudy in 5 min. and a heavy gum separated. The reaction mixture was cooled in an ice-water bath and the gum solidified. It was collected on a filter, washed with ethyl acetate-ether to give a colorless solid of M.P. 230–237° (dec.) with softening at 225°, yield 32.5 g. It was dissolved in aqueous methanol and saturated with dry hydrogen chloride. Ether was added to give a colorless solid of M.P. 225–232°, yield 23.8 g. It was recrystallized again in the same manner to give a pure salt of M.P. 224–226° (dec.) with softening at 196° and resolidified, yield 18.2 g.

*Analysis.*—Calcd. for $C_{21}H_{24}N_4O_2 \cdot 2HCl \cdot H_2O$: N, 12.3; HCl, 16.0. Found: N, 12.2; HCl, 16.0.

C. 3-[3-(4-PHENYL-1-PIPERAZYL)PROPYL]-2,4(1H,3H)-QUINAZOLINEDIONE

Five grams of the above salt was converted to the free base and recrystallized from aqueous DMF to give a colorless solid of M.P. 202–203°.

$\nu_{max.}^{KCl}$ 1720 and 1660 cm.$^{-1}$ (imide carbonyls).

*Analysis.*—Calcd. for $C_{21}H_{24}N_4O_2$: C, 69.3; H, 6.60; N, 15.4. Found: C, 68.8; H, 6.96; N, 15.4, 15.6.

D. 1-[3-(o-CARBETHOXYAMINOBENZAMIDO)PROPYL]-4-PHENYL PIPERAZINE DIHYDROCHLORIDE

To a boiling solution of 1-phenyl-4-[3-(o-aminobenzamido)propyl]piperazine (20.3 g., 0.06 mole) in 150 ml. of chlorobenzene was added dropwise a solution of ethyl chloroacetate (6.5 g., 0.06 mole) in 50 ml. of chlorobenzene during 10 minutes to give a light amber solution. It was refluxed with stirring for 1.5 hours and kept at room temperature overnight. The solvent was removed in vacuo to leave a dark reddish brown syrup. It was dissolved in hot methanol and saturated with dry hydrogen chloride. Ethyl acetate was added to give a solid of M.P. 201–203° (dec.), yield 25.0 g. It was once recrystallized from aqueous methanolic hydrogen chloride-ethyl acetate to give a colorless solid of M.P. 203–204° (dec.), yield 21.0 g., $\nu_{max.}^{KCl}$ 33330 cm.$^{-1}$ (N—H), 1710 cm.$^{-1}$ (ester C=O), 1650 cm.$^{-1}$ (amide C=O), 1520 cm.$^{-1}$ (amide II).

*Analysis.*—Calcd. for $C_{23}H_{32}Cl_2N_4O_3$: HCl, 15.1. Found: HCl, 15.0.

E. 3-[3-(4 - PHENYL-1-PIPERAZYL)PROPYL]-2,4(1H,3H)-QUINAZOLINEDIONE DIHYDROCHLORIDE MONOHYDRATE

The above dihydrochloride (21.0 g., 0.044 mole) was heated at 220–230° for 3 hours in a wax bath to give a dark brown melt. It was dissolved in aqueous methanol, heated with charcoal and treated with dry hydrogen chloride. The hot solution was diluted with ethyl acetate to give a light yellow solid of M.P. 187–188° (dec.), yield 16.6 g. It was recrystallized from aqueous methanolic hydrogen chloride-ethyl acetate to give a pale yellow solid of M.P. 223–233° with softening at 183–187°, yield 14.2 g. The I.R. spectrum (KCl disc) was identical with the one obtained in B above.

*Analysis.*—Calcd. for $C_{21}H_{26}Cl_2N_4O_2 \cdot H_2O$: HCl, 16.0. Found: HCl, 16.1.

F. 3-[3-(4-PHENYL-1-PIPERAZYL)PROPYL]-2,4(1H,3H)-QUINAZOLINEDIONE

The free base was obtained and it melted at 192–194°, yield 12.1 g. It was recrystallized from aqueous DMF (charcoal) to give a crystalline solid of M.P. 202–203°, yield 6.7 g. The mixed M.P. with an authentic sample (from C above) was not depressed.

EXAMPLE 5

*3-[3-(4-o-chlorophenyl-1-piperazyl)propyl]-2,4(1H,3H)-quinazolinedione*

A. 1-o-CHLOROPHENYL-4-[3-(o-AMINOBENZAMIDO)PROPYL]PIPERAZINE

A mixture of 1-(3-aminopropyl)-4-o-chlorophenylpiperazine (56.4 g., 0.22 mole) and isatoic anhydride (36.3 g., 0.22 mole) was heated on a steam bath for 5 hours. The dark viscous syrup was dissolved in 2-propanol, saturated with dry hydrogen chloride and diluted with ethyl acetate and ether to give 70 g. of crude hydrochloride. It was recrystallized from methanolic hydrogen chloride-ethyl acetate to give 57.6 g. of the hydrochloride. It was converted to the free base, extracted with chloroform and dried over anhydrous magnesium sulfate. The extract was stripped off the solvent and the remaining syrup was used for subsequent reaction without purification.

B. 3-[3-(4-o-CHLOROPHENYL-1-PIPERAZYL)PROPYL]-2,4(1H,3H)-QUINAZOLINEDIONE HYDROCHLORIDE

To a boiling solution of the above amine (43.5 g., 0.117 mole) in 250 ml. of chlorobenzene was introduced a slow stream of phosgene during 60 min. with vigorous stirring to give a light tan solid mass. It was collected by suction, washed with ethyl acetate-ether and dried in air, yield 48.0 g., M.P. 265–269° (dec.). It was recrystallized from aqueous ethanol-ethyl acetate (charcoal) to give a light buff colored solid of M.P. >260°, yield 39.0 g.

*Analysis.*—Calcd. for $C_{21}H_{24}Cl_2N_4O_2$: HCl, 8.40. Found: HCl, 8.48.

EXAMPLE 6

*3-[3-(4-m-chlorophenyl-1-piperazyl)propyl]-2,4-(1H,3H)-quinazolinedione*

A. 1-[3-(o-AMINOBENZAMIDO)PROPYL]-4-m-CHLOROPHENYLPIPERAZINE

A mixture of 1-m-chlorophenyl-4-(3-aminopropyl)piperazine (32.5 g., 0.128 mole) and isatoic anhydride (20.9 g., 0.128 mole), after the initial reaction subsided, was heated in a wax bath at 190–200° for 3 hours to give a dark brown melt. It was triturated with hot methanol and the resulting light tan powder was collected, yield 35.2 g. (69%), M.P. 154–155°. It was recrystallized from aqueous methanol-acetone (charcoal) to give light buff colored needles of M.P. 154–155°, yield 30.7 g.

*Analysis.*—Calcd. for $C_{20}H_{25}ClN_4O$: N, 15.0. Found: N, 15.1, 15.1, 14.9.

B. 3-[3-(4-m-CHLOROPHENYL-1-PIPERAZYL)PROPYL]-2,4(1H,3H)-QUINAZOLINEDIONE DIHYDROCHLORIDE MONOHYDRATE

To a boiling solution of the above amine (29.8 g., 0.08 mole) in 250 ml. of chlorobenzene was bubbled in phosgene during 60 min. to give a light cream colored solid which separated from the hot solution. The reaction mixture was cooled and the solid was collected on a filter, washed with ethyl acetate-ether and dried in air, yield 38.1 g., M.P. 239–240°. It was dissolved in aqueous dimethylformamide-methanol, treated with dry hydrogen chloride and diluted with ethyl acetate-ether to give a colorless solid of M.P. 233–234° (bubbling at 190°), yield 16.7 g.

*Analysis.*—Calcd. for $C_{21}H_{23}ClN_4O_2 \cdot 2HCl \cdot H_2O$: HCl, 14.9. Found: HCl, 14.7.

C. 3-[3-(4-m-CHLOROPHENYL-1-PIPERAZYL)-PROPYL]-2,4-(1H,3H)-QUINAZOLINEDIONE

The filtrate was concentrated in vacuo to leave a white solid separated from the hot solution, yield 17.7 g., M.P. 234–236° (dec.). It was treated with sodium hydroxide solution to give a gum which slowly solidified. It was collected on a filter and dried in air, yield 15.6 g., M.P. 190–195°. It was once recrystallized from aqueous DMF to give a colorless solid of M.P. 195–196°.

$\nu_{max.}^{KCl}$ 1710 and 1670 cm.$^{-1}$ (imide carbonyls), no amide II band.

*Analysis.*—Calcd. for $C_{21}H_{23}ClN_4O_2$: C, 63.3; H, 5.76; N, 14.0. Found: C, 63.3; H, 6.17; N, 14.2.

EXAMPLE 7

*3-[3-(4-phenethyl-1-piperazyl)propyl]-2,4-(1H,3H)-quinazolinedione*

A. 1-PHENETHYL-4-[3-(o-AMINOBENZAMIDO)PROPYL]PIPERAZINE TRIHYDROCHLORIDE

A mixture of 1-phenethyl-4-(3-aminopropyl)piperazine (36.1 g., 0.146 mole) and isatoic anhydride (21.8 g., 0.146 mole) was kept at room temperature overnight after the initial reaction subsided. The dark solid was dissolved in hot methanol and saturated with dry hydrogen chloride. Ethyl acetate was added to give a light buff colored solid on scratching, yield 46.4 g., M.P. 264–266° (dec.). A sample was recrystallized from aqueous methanol-ethyl acetate to give a light buff colored solid of M.P. >250°.

*Analysis.*—Calcd. for $C_{22}H_{30}N_4O \cdot 3HCl$: HCl, 23.0. Found: HCl, 22.6.

B. 1-PHENETHYL-4-[3-(o-AMINOBENZAMIDO)PROPYL]PIPERAZINE

The hydrochloride was treated with sodium hydroxide solution to give a free base of M.P. 112–113°, yield 31.4 g. It was once recrystallized from aqueous methanol and dried in an oven at 75°, yield 25.0 g., M.P. 112–113°. From the filtrate another 5.0 g. of the product was obtained, M.P. 111–112° The first crop was analyzed.

*Analysis.*—Calcd. for $C_{22}H_{30}N_4O$: N, 15.3. Found N, 15.5.

C. 3-[3-(4-PHENETHYL-1-PIPERAZYL)PROPYL]-2,4-(1H,3H)-QUINAZOLINEDIONE HYDROCHLORIDE

To a boiling solution of the above amine (29.0 g., 0.079 mole) in 150 ml. of chlorobenzene was bubbled in a slow stream of phosgene during 50 min. with vigorous stirring to give a colorless solid. The reaction mixture was cooled in an ice-water bath and the solid was collected on a filter, washed with ethyl acetate-ether and dried, yield 36.6 g., M.P. >260° (99.5%). It was dissolved in hot aqueous methanol, saturated with dry hydrogen chloride and the hydrochloride separated from the hot solution, yield 33.6 g., M.P. >260°.

*Analysis.*—Calcd. for $C_{23}H_{26}Cl_2N_4O$: HCl, 15.7. Found: HCl, 15.7.

D. 3-[3-(4-PHENETHYL-1-PIPERAZYL)PROPYL]-2,4-(1H,3H)-QUINAZOLINEDIONE

The above hydrochloride (9.5 g.) was converted to free base with sodium hydroxide solution and the oily free base soon solidified, yield 7.0 g. It was recrystallized from aqueous DMF to give a colorless solid of M.P. 166–167°.

$\nu_{max.}^{CHCl_3}$ 3390 cm.$^{-1}$ (N—H), 1720 and 1670 cm.$^{-1}$ (imide carbonyls), no amide II band.

*Analysis.*—Calcd. for $C_{23}H_{28}N_4O_2$: N, 14.3. Found: N, 14.5.

EXAMPLE 8

*3-[3-(4-phenyl-1-piperidyl)propyl]-2,4(1H,3H)-quinazolinedione*

A. 1-[3-(o-AMINOBENZAMIDO)PROPYL]-4-PHENYLPIPERIDINE

A mixture of 1-(3-aminopropyl)-4-phenylpiperidine (38.8 g., 0.178 mole) and isatoic anhydride (29.0 g., 0.178 mole) was heated on a steam bath for an hour to give a dark semi-solid.

B. 3-[3-(4-PHENYL-1-PIPERIDYL)PROPYL]-2,4-(1H,3H)-QUINAZOLINEDIONE

The dark semi-solid was dissolved in 150 ml. of chlorobenzene and reacted with a slow stream of phosgene at the boiling point of the solvent during 60 minutes to give a dark oil which separated from the hot solution. After standing overnight at room temperature the resulting dark semi-solid was treated with aqueous sodium hydroxide-chloroform and the aqueous layer was extracted with ethyl acetate. The combined extracts were dried quickly while they were still warm and filtered. The solution gave 20.1 g. of the free base on cooling as a first crop, M.P. 168–172°. The mother liquor gave a second crop on cooling in an ice-water bath, M.P. 166–168°, yield 10.2 g. The combined solids were recrystallized from aqueous DMF to give a light tan solid of M.P. 168–175°, yield 23.8 g. The second recrystallization gave a pure product of M.P. 172–176°, yield 21.9 g.

$\nu_{max.}^{KCl}$ 1720 and 1650 cm.$^{-1}$ (imide carbonyls), no amide II band.

*Analysis.*—Calcd. for $C_{22}H_{25}N_3O_2$: N, 11.6. Found: N, 11.9.

C. 3-[3-(4-PHENYL-1-PIPERIDYL)PROPYL]-2,4(1H,3H)-QUINAZOLINEDIONE MALEATE

The free base (21.5 g., 0.06 mole) was suspended in ethyl acetate and reacted with maleic acid (6.95 g., 0.06 mole) to give a colorless powder of M.P. 192–194° (dec.), yield 27.0 g. It was recrystallized from methanol-ethyl acetate-ether to give a pure maleate of M.P. 201–202° (dec.), yield 20.7 g.

$\nu_{max.}^{KCl}$ 1720 and 1660 cm.$^{-1}$ (imide carbonyls), no amide II band.

*Analysis.*—Calcd. for $C_{22}H_{25}N_3O_2 \cdot C_4H_4O_4$: C, 65.2; H, 6.05; N, 8.77. Found: C, 65.0; H, 5.66; N, 8.88.

EXAMPLE 9

*3-(3-diethylaminopropyl)-2,4(1H,3H)-quinazolinedione hydrochloride.*

A mixture of 3-diethylaminopropylamine (65.2 g., 0.4 mole) and isatoic anhydride (52.0 g., 0.4 mole) gave a dark syrup with evolution of carbon dioxide. It was heated on a steam bath for an hour and set aside overnight. It was dissolved in 200 ml. of chlorobenzene and a slow stream of phosgene was introduced at the boiling point of the solvent during 2 hours to give a dark oil. Ethyl acetate was added and the mixture was cooled in an ice-water bath to give a light tan solid of M.P. 211–214°, yield 124.8 g. It was twice recrystallized from methanol to give a little solvated solid which was dried in vacuo in a desiccator, yield 87.3 g., M.P. 227–228°.

*Analysis.*—Calcd. for $C_{15}H_{22}ClN_3O_2$: C, 57.7; H, 7.06; N, 13.5. Found: C, 58.0; H, 7.62; N, 13.7.

EXAMPLE 10

*3-[6-(4-phenyl-1-piperazyl)hexyl]-2,4(1H,3H)-quinazolinedione*

A. 1-PHENYL-4-[6-(o-AMINOBENZAMIDO)HEXYL]PIPERAZINE

A mixture of 1-phenyl-4-(6-aminohexyl)piperazine (68.1 g., 0.261 mole) and isatoic anhydride (42.5 g., 0.261 mole) was heated on a steam bath for 3 hours to give a dark melt. It was dissolved in 200 ml. of hot methanol and added to 250 ml. of 2-propanol saturated with hydrogen chloride (86.6 g., 2.36 mole) to give a dark hot solution. It was diluted with ethyl acetate and cooled in an ice-water bath to give a light tan solid which was collected on a filter and dried in vacuo in a desiccator, yield 127.6 g. (99%). It was suspended in water and treated with sodium hydroxide solution to give a light tan solid. It was three times recrystallized from aqueous DMF to give a light tan crystalline solid of M.P. 83–91°, yield 66.5 g. A sample was recrystallized twice more from aqueous DMF to give an analytical sample of M.P. 98–101°.

$\nu_{max.}^{CHCl_3}$ 3450 and 3330 cm.$^{-1}$ (NH and NH$_2$), 1640 cm.$^{-1}$ (amide C=O), 1520 and 1500 cm.$^{-1}$ (amide II).

*Analysis.*—Calcd. for $C_{23}H_{32}N_4O$: N, 14.7. Found: N, 15.1.

B. 3-[6-(4-PHENYL-1-PIPERAZYL)HEXYL]-2,4(1H,3H)-QUINAZOLINEDIONE HYDROCHLORIDE

To a boiling solution of the above amine (47.9 g., 0.126 mole) in 250 ml. of chlorobenzene was bubbled in a slow stream of phosgene during 60 min. with vigorous stirring to give a light tan solid from the hot solution. The reaction mixture was cooled in an ice-water bath and the solid product was collected on a filter, washed with ethyl acetate and dried in air, yield 55.5 g., M.P. 256–259°. It was recrystallized from aqueous methanol-DMF containing hydrogen chloride to give a slightly buff colored solid of M.P. 231–234°, yield 46.5 g. It was again recrystallized in the same way to give a product melting at 259–261° (dec.) with softening at 226°, yield 32.1 g.

*Analysis.*—Calcd. for $C_{24}H_{31}ClN_4O_2$: N, 8.25; H, 12.7. Found: N, 8.40; HCl, 13.0.

Example 11

*3-(3-pyridylmethyl)-2,4(1H,3H)-quinazolinedione*

A. 3-(o-AMINOBENZAMIDOMETHYL)PYRIDINE

To 3-aminomethylpyridine (32.4 g, 0.3 mole) was added isatoic anhydride (48.9 g., 0.3 mole) to cause evolution of heat and carbon dioxide. A small amount of benzene was added to the mixture which soon solidified. It was heated on a steam bath overnight and recrystallized once from aqueous DMF to give a tan solid, yield 53.7 g. (79.0%). A sample was once recrystallized from aqueous acetone (charcoal) to give a colorless solid of M.P. 127–128°.

*Analysis.*—Calcd. for $C_{13}H_{13}N_3O$: N, 18.5. Found: N, 18.6.

B. 3-(3-PYRIDYLMETHYL)-2,4(1H,3H)-QUINAZOLINEDIONE

To a boiling solution of the above amine (51.1 g., 0.248 mole) in 400 ml. of chlorobenzene was introduced a slow stream of phosgene during 30 minutes with stirring to give a yellowish tan solid which came out from the hot solution and made stirring impossible. The reaction mixture was cooled down to room temperature and chlorobenzene was decanted off. The solid was dissolved in hot methanol (charcoal) and diluted with ethyl acetate to give a crystalline hydrochloride of M.P. 229–232° (dec.), yield 29.9 g. (41.5%). One more recrystallization gave a solid of M.P. 238° (dec.) with softening at 221–224°, yield 26.8 g. It was dissolved in water and made basic with concentrated ammonium hydroxide to give a white gum which soon solidified on scratching, yield 21.9 g. It was recrystallized from aqueous DMF to give a colorless powder of M.P. 238–239°, yield 15.0 g.

$\nu_{max.}^{KCl}$ 1720 and 1670 cm.$^{-1}$ (imide carbonyls), no amide II.

*Analysis.*—Calcd. for $C_{14}H_{11}N_3O_2$: N, 16.6. Found: N, 16.7.

C. 3-(3-PYRIDYLMETHYL)-2,4(1H,3H)-QUINAZOLINE-DIONE HYDROCHLORIDE

The free base (13.8 g.) was suspended in methanol and treated with dry hydrogen chloride to give a hot clear solution which was diluted with ethyl acetate to obtain a colorless fluffy solid of M.P. 245–247°, yield 13.0 g.

$\nu_{max.}^{KCl}$ 1710 and 1660 cm.$^{-1}$ (imide carbonyls), no amide II.

*Analysis.*—Calcd. for $C_{14}H_{12}ClN_3O_2$: N (basic), 4.83; HCl, 12.7. Found: N (basic), 4.72; MCl, 12.3.

Example 12

3-[5-(4-phenyl-1-piperazyl)pentyl]-2,4(1H,3H)-quinazolinedione

A. 1-[5-(o-AMINOBENZAMIDO)PENTYL]-4-PHENYLPIPERAZINE

A mixture of isatoic anhydride (31.7 g., 0.194 mole) and 4-phenyl1-(5-aminopentyl)piperazine (48.0 g., 0.194 mole) was heated on a steam bath for 1 hour. The solid product was thrice recrystallized from aqueous methanol (charcoal) to give a solid of M.P. 112–116°.

*Analysis.*—Calcd. for $C_{22}H_{30}N_4O$: N, 15.3. Found: N, 15.9.

B. 3-[5-(4-PHENYL-1-PIPERAZYL)PENTYL]-2,4(1H,3H)-QUINAZOLINEDIONE DIHYDROCHLORIDE

To a boiling suspension of the above amine (57.4 g., 0.157 mole) in 250 ml. of chlorobenzene was bubbled in a slow stream of phosgene during 60 minutes to give a light tan solid. After standing overnight the reaction mixture was filtered to collect the solid product, yield 70.2 g. It was thrice recrystallized from aqueous methanol-ether to give a pure dihydrochloride of M.P. 211–213° (dec.), yield 28.5 g., $\nu_{max.}^{KCl}$ 1710 and 1660 cm.$^{-1}$ (imide carbonyls), no amide II band.

*Analysis.*—Calcd. for $C_{23}H_{30}Cl_2N_4O_2$: N, 12.0; HCl, 15.7. Found: N, 11.8; HCl, 15.8.

C. 3-[5-(4-PHENYL-1-PIPERAZYL)PENTYL]-2,4-(1H,3H)-QUINAZOLINEDIONE

The hydrochloride (5.0 g.) was treated with concentrated ammonium hydroxide to give a free base melting at 169–173°. It was once recrystallized from aqueous acetone-DMF to give a colorless crystalline solid of M.P. 172–173°.

$\nu_{max.}^{KCl}$ 1720 and 1670 cm.$^{-1}$ (imide carbonyls), no amide II band.

*Analysis.*—Calcd. for $C_{23}H_{28}N_4O_2$: N, 14.3. Found: N, 14.2.

Example 13

3-[4-(4-phenyl-1-piperazyl)butyl]-2,4(1H,3H)-quinazolinedione

A. 1-[4-(o-AMINOBENZAMIDO)BUTYL]-4-PHENYLPIPERAZINE

A mixture of 1-phenyl-4-(4-aminobutyl)piperazine (24.8 g., 0.107 mole) and isatoic anhydride (17.4 g., 0.107 mole) was heated on a steam bath overnight and the resulting solid mass was recrystallized from aqueous acetone to give a pale yellow solid of M.P. 107–110°, yield 26.2 g. (69.9%).

B. 3-[4-(4-PHENYL-1-PIPERAZYL)BUTYL]-2,4(1H,3H)-QUINAZOLINEDIONE

To a boiling solution of the above amine (26.2 g., 0.0754 mole) in 160 ml. of chlorobenzene was bubbled in a slow stream of phosgene during 30 minutes to give a light tan solid, yield 35.8 g., M.P. 270–274° (dec.). It was treated with concentrated ammonium hydroxide to give a free base which was recrystallized from aqueous acetone-DMF to give 22.9 g. of a solid melting at 195–198°. It was again recrystallized from aqueous DMF to give a slightly tan solid of M.P. 196.5–197.5°.

$\nu_{max.}^{KCl}$ 1720 and 1660 cm.$^{-1}$ (imide carbonyls).

*Analysis.*—Calcd. for $C_{22}H_{26}N_4O_2$: C, 69.9; H, 6.88; N, 14.8. Found: C, 70.1; H, 6.99; N, 15.0.

C. 3-[4-(4-PHENYL-1-PIPERAZYL)BUTYL]-2,4(1H,3H)-QUINAZOLINEDIONE DIHYDROCHLORIDE

The free base was suspended in hot methanol and treated with dry hydrogen chloride. Enough water was added until all the solid dissolved. Ethyl acetate was added to the hot solution to give a solid of M.P. 276–277° (dark melt), yield 20.9 g.

*Analysis.*—Calcd. for $C_{22}H_{28}Cl_2N_4O_2$: N (basic), 3.11; HCl, 16.2. Found: N (basic), 3.11; HCl, 16.1.

EXAMPLE 14

3-[3-(4-phenyl-1-piperazyl)propyl]-6-chloro-2,4(1H,3H)-quinazolinedione

A. 3-[3-(4-PHENYL-1-PIPERAZYL)PROPYL]-6-CHLORO-2,4(1H,3H)-QUINAZOLINEDIONE

A mixture of 1-(3-aminopropyl)-4-phenylpiperazine (30.0 g., 0.14 mole), and 6-chloroisatoic anhydride (27.5 g., 0.14 mole) was heated on a steam bath for an hour and dissolved in hot methanol-chloroform. The product was obtained when the solution was cooled and it melted at 143–148°, yield 44.0 g. A suspension of the solid (44 g.) in 250 ml. of boiling chlorobenzene was treated with phosgene during an hour to give an oily material which separated from the hot reaction mixture. It crystallized when cooled and was collected by suction. The free base was obtained when the hydrochloride was treated with sodium hydroxide solution and was recrystallized twice from aqueous methanol to give the quinazolinedione of M.P. 227–230°, yield 41.0 g. (71.4%).

*Analysis.*—Calcd. for $C_{21}H_{23}ClN_4O_2$: N, 14.0. Found: N, 13.7.

B. 3-[3-(4-PHENYL-1-PIPERAZYL)PROPYL]-6-CHLORO-2,4(1H,3H)-QUINAZOLINEDIONE MALEATE

To the above product (30.0 g., 0.075 mole) was added a solution of maleic acid (8.7 g., 0.075 mole) in 30 ml. of methanol and the resulting solution was heated on a steam bath for a few minutes and then cooled in an ice-water bath to give the maleate which was collected by suction and was recrystallized twice from aqueous methanol, M.P. 213–216°.

*Analysis.*—Calcd. for $C_{21}H_{23}ClN_4O_2 \cdot C_4H_4O_4$: N, 10.9; N (basic), 2.73. Found: N, 10.7; N (basic), 2.76.

EXAMPLE 15

3-[4-(4-phenyl-1-piperazyl)butyl]-6-chloro-2,4(1H,3H)-quinazolinedione maleate A mixture of 1 - (4 - aminobutyl) - 4 - phenylpiperazine (20.0 g., 0.085 mole) and 6-chloroisatoic anhydride (10.7 g., 0.085 mole) was heated on a steam bath for an hour. The solid mass was dissolved in hot methanol and diluted with ether to give a crude product; 1-[4-(2'-amino-5'-chlorobenzamido)butyl]-4-phenylpiperazine. It was dissolved in boiling chlorobenzene (250 ml.) and treated with a slow stream of phosgene for an hour. A thick oil separated out which solidified upon cooling. The hydrochloride was shaken with a mixture of 20% sodium hydroxide solution and chloroform and the insoluble solid was collected by suction. It was recrystallized from aqueous methanol to give 10 g. (30% yield) of the quinazolinedione, M.P. 210–215°. It was converted to the maleate and recrystallized to give 2.0 g. of the pure maleate of M.P. 227–229°.

*Analysis.*—Calcd. for $C_{26}H_{29}ClN_4O_6$: N, 10.6; N (basic), 2.65. Found: N, 10.4; N (basic), 2.65.

EXAMPLE 16

A. 3-[5-(4-PHENYL-1-PIPERAZYL)PENTYL]-6-CHLORO-2,4(1H,3H)-QUINAZOLINEDIONE

A mixture of 6-chloroisatoic anhydride (30.0 g., 0.15 mole) and 1-(5-aminopentyl)-4-phenylpiperazine (37.0 g., 0.15 mole) was heated on a steam bath for an hour and the resulting solid mass was dissolved in hot methanol. The solution was diluted with ether to precipitate a crude 1 - [5 - (2' - amino - 5' - chlorobenzamido)pentyl] - 4 - phenylpiperazine which was recrystallized from methanol-ether to give 32 g. of the product melting at 115–120°. It was dissolved in 500 ml. of boiling chlorobenzene and phosgene was introduced slowly during an hour. The reaction mixture was cooled and the solid product was collected on a filter and then treated with sodium hydroxide solution to generate the free base which was recrystallized from aqueous methanol to give a solid of M.P. 185–187°, yield 30.0 g.

*Analysis.*—Calcd. for $C_{23}H_{27}ClN_2O_2$: N, 13.1. Found: N, 13.6.

B. 3-[5-(4-PHENYL-1-PIPERAZYL)PENTYL]-6-CHLORO-2,4(1H,3H)-QUINAZOLINEDIONE DIHYDROCHLORIDE

The above solid was dissolved in methanol and treated with excess dry hydrogen chloride to give a precipitate of hydrochloride which was collected and recrystallized three times from aqueous methanol, M.P. 226–230°, yield 13.0 g.

*Analysis.*—Calcd. for $C_{23}H_{27}ClN_2O_2 \cdot 2HCl$: N, 11.2; N (basic), 5.61. Found: N, 11.2; N (basic), 5.84.

EXAMPLE 17

3-[3-(4-m-chlorophenyl-1-piperazyl)propyl]-2,4(1H,3H)-quinazolinedione monohydrochloride To a boiling solution of 1-[3-(o-aminobenzamido)propyl]-4-m-chlorophenylpiperazine, the product of Example 6A, (365 g.) in 2 l. of chlorobenzene was bubbled in a slow stream of phosgene (105 g.) during an hour period and then the reaction mixture was kept at room temperature overnight. It was cooled in an ice-water bath and the solid product was collected on a filter, washed with 2-propanol-ether and the wet cake was recrystallized from a mixture of 750 ml. of DMF and 2 liters of water. The slightly tan product was again recrystallized from a mixture of 500 ml. of acetic acid and 1500 ml. of water (charcoal) and the pure product was collected by suction, washed with acetone and dried in an oven at 50°, M.P. 240–241°, yield 292 g. (70.5% based on the amide).

*Analysis.*—Calcd. for $C_{21}H_{23}ClN_4O_2 \cdot HCl$: N (basic), 3.22; HCl, 8.38. Found: N (basic), 3.17; HCl, 8.45.

EXAMPLE 18

4-m-chlorophenyl-1-methyl-1-[3-{2,4-dioxo-3(1H,3H)-quinazolinyl}propyl]piperazinium methosulfate To a hot solution of 3-[3-(4-m-chlorophenyl-1-piperazyl)propyl]-2,4(1H,3H)-quinazolinedione (27.6 g., 0.069 mole) in a mixture of acetone (150 ml.) and DMF (100 ml.) was added 20 ml. of dimethyl sulfate and the clear solution was refluxed for an hour. The solution was concentrated in vacuo and ethyl acetate-ether was added to give an oil which soon solidified to give a colorless solid. It was collected on a filter, washed with ethyl acetate-ether and dried in air, yield 18.2 g. It was once recrystallized from methanol-ethyl acetate to give a colorless solid of M.P. 204–206° (dec.), yield 15.3 g.

$\nu_{max.}^{KCl}$ 3280 (N—H), 1725 and 1640 cm.$^{-1}$ (imide carbonyls), no amide II band.

*Analysis.*—Calcd. for $C_{21}H_{23}ClN_4O_2(CH_3)_2SO_4$: C, 52.3; H, 6.22; N, 10.2. Found: C, 52.6; H, 5.54; N, 10.3.

EXAMPLE 19

3-(3-morpholinopropyl)-2,4(1H,3H)-quinazolinedione

A. N-3-(o-AMINOBENZAMIDO)PROPYLMORPHOLINE

To N-(3-aminopropyl)morpholine (57.6 g., 0.4 mole) was added isatoic anhydride (65.2 g., 0.4 mole) to give a slurry with evolution of heat and carbon dioxide. The reaction mixture was heated on a steam bath for 45 minutes and cooled to room temperature. A large excess of ether was added to give a milky solution from which soon deposited a colorless solid on scratching, yield 95.4 g., M.P. 98–100°. Upon dilution of the filtrate with Skelly B another 3.8 g. of the product was obtained. The total yield was 99.2 g. A sample was recrystallized from acetone-Skelly B to give a colorless solid of M.P. 99–101°.

*Analysis.*—Calcd. for $C_{14}H_{21}N_3O_2$: N(basic), 5.21. Found: N (basic), 5.24 (titration).

B. 3-(3-MORPHOLINOPROPYL)-2,4(1H,3H)-QUINAZOLINEDIONE

To a boiling solution of the above amine (46.3 g., 0.172 mole) in 250 ml. of chlorobenzene was bubbled in phosgene during a 45 minute period with vigorous stirring to give an amber colored gum which made stirring difficult. The reaction mixture was cooled in an ice-water bath to give a hard solid mass which was dissolved in hot methanol, treated with charcoal and diluted with ethyl acetate-ether to give a light tan sticky syrup which gradually solidified on scratching, yield 52.7 g. It was recrystallized twice from acqueous 2-propanol-ethyl acetate and then the free base was obtained by treating it with acqueous ammonia, yield 18.2 g., M. P. 165–168°. A sample was recrystallized from aqueous acetone-DMF to give a colorless solid of M.P. 168–169°.

*Analysis.*—Calcd. for $C_{15}H_{18}N_3O_3$: N, 14.6. Found: N, 14.7.

C. 3-(MORPHOLINOPROPYL-2,4(1H,3H)-QUINAZOLINEDIONE HYDROCHLORIDE

The above free base (15.1 g.) was suspended in methanol, saturated with dry hydrogen chloride and diluted with ether to give a colorless solid of M.P. 242–243°, yield 14.4 g.

$\nu_{max.}^{KCl}$ 1720 and 1665 cm.$^{-1}$ (imide carbonyls), 1120 cm.$^{-1}$ (aliphatic ether), no amide II band.

*Analysis.*—Calcd. for $C_{15}H_{18}N_3O_3 \cdot HCl$: N, 12.9; HCl, 11.3. Found: N, 12.8; HCl, 11.4.

EXAMPLE 20

3-{3-[1-Methyl-2,3,4,5-tetrahydro-1,4(1H)-benzodiazepin-4-yl]-propyl}-2,4(1H,3H)-quinazolinedione

A. 1-METHYL-2,3,4,5-TETRAHYDRO-1,4-BENZODIAZEPINE

N-methyl-N'-phenylethylenediamine (166.2 g., 1.1 mole) was added slowly to 250 ml. of 90% formic acid at about 10°. Formalin (37%, 90 ml.) was added to the solution which was then heated on a steam bath for 60 hours. Then the solution was cooled and poured onto ice and made basic with concentrated sodium hydroxide solution. The free base was taken up in chloroform and the extract was dried. After removing the solvent in vacuo the free base was heated in 20% hydrochloric acid overnight. The water was evaporated and the free base was generated with sodium hydroxide solution and then extracted with ether. The extract was dried the solvent was stripped off and the free base was distilled to give a liquid boiling at 87–93° (0.43 mm.), yield 45 g. (25%).

Analysis.—Calcd. for $C_{10}H_{14}N_2$: N (basic), 8.64. Found: N (basic), 8.63.

B. 1-METHLY-2,3,4,5-TETRAHYDRO-1,4-BENZODIAZEPINE HYDROCHLORIDE

The hydrochloride from above melted at 148–152°.

Analysis.—Calcd. for $C_{10}H_{14}N_2 \cdot HCl$: N (basic), 7.05; HCl, 18.4. Found: N (basic), 6.96; HCl, 19.3.

C. 4-(3-AMINOPROPYL)-1-METHYL-2,3,4,5-TETRAHYDRO-1,4-BENZODIAZEPINE

The above amine (15 g., 0.093 mole) and acrylonitrile (5.4 g., 0.102 mole) in 20 ml. of dry benzene was refluxed for 2 hours. The solvent was removed and then the residue was distilled to give 4.5 g. of the starting amine and 11.5 g. (75% yield) of the nitrile which was reduced with Raney nickel catalyst in ammonia saturated methanol under 1000 lb. of hydrogen at 100° to give the amine of B.P. 107–114° (0.025 mm.), yield 6.4 g. (55%).

Analysis.—Calcd. for $C_{13}H_{22}N_3$: N (basic), 6.36. Found: N (basic), 6.35.

D. 3-{3-[1-METHYL-TETRAHYDRO-1,4(1H)-BENZODIAZOPIN-4-YL]-PROPYL}-2,4(1H,3H)-QUINAZOLINE DIHYDROCHLORIDE

A mixture of the above amine (6.4 g., 0.029 mole) and isatoic anhydride (4.8 g., 0.029 mole) in 25 ml. of benzene was refluxed for an hour and then the solvent was stripped off. The remaining oil was dissolved in 75 ml. of chlorobenzene and phosgene was bubbled in under reflux during a 30 minute period to give a gummy solid. It solidified on cooling and recrystallized from methanol containing hydrogen chloride to give a yellow solid. It was collected and slurried in hot 2-propanol, yield 7.5 g. (59%), M.P. 217–218°.

Analysis.—Calcd. for $C_{21}H_{24}N_4O_2 \cdot 2HCl$: N, 12.8; N (basic), 3.20. Found: N, 12.8; N (basic), 3.12.

EXAMPLE 21

3-{2-[1-Methyl-2,3,4,5-tetrahydro-1,4(1H)-benzodiazepin-4-yl]ethyl}-2,4(1H,3H)-quinazolinedione

A. 4-CYANOMETHYL-1-METHYL-2,3,4,5-TETRAHYDRO-1,4-BENZODIAZEPINE

To a solution of sodium bisulfite (10.4 g., 0.1 mole) in 35 ml. of water was added 8.1 ml. (0.1 mole) of 37% formalin. 1-methyl-2,3,4,5-tetrahydro-1,4-benzodiazepine (16.2 g., 0.1 mole) was added to the solution and heated an additional 3 hours. The aqueous layer was separated at 70° for 2 hours. Then 6.5 g. (0.1 mole) of potassium cyanide was added and the mixture was heated at 70° for and extracted with ether. The ether extract was added to the organic layer and dried. Distillation gave 15.7 g. (78% yield) of the 4-cyanomethyl derivative boiling at 139–144°. (0.5 mm.).

Analysis.—Calcd. for $C_{12}H_{15}N_3$: N,21.0 Found: N, 20.7.

B. 4-AMINOETHYL-1-METHYL-2,3,4,5-TETRAHYDRO-1,4-BENZODIAZEPINE

The cyanomethyl derivative was reduced with Raney nickel catalyst in ammonia saturated methanol under 1000 lb. of hydrogen at 100° to give the 4-aminoethyl compound in 67% yield, 10.7 g., B.P. 113°. (0.025 mm.).

Analysis.—Calcd. for $C_{12}H_{19}N_3$: N (basic), 13.6. Found: N (basic), 13.3.

C. 3-{2-[1-METHYL-2,3,4,5-TETRAHYDRO-1,4(1H)-BENZODIAZEPIN-4-YL]ETHYL}-2,4(1H,3H)-QUINAZOLINEDIONE DIHYDROCHLORIDE MONOMETHANOLATE

The above amine (10.5 g., 0.051 mole) and isatoic anhydride (8.3 g., 0.051 mole) were reacted as described before. The product was dissolved in boiling chlorobenzene and treated with phosgene to give a solid which was heated in methanol to give a dihydrochloride monomethanolate, yield 3.5 g., M.P. 210° (dec.).

Analysis.—Calcd. for $C_{21}H_{28}Cl_2N_4O_3$: N, 12.3; N (basic), 3.08; HCl, 16.1. Found: N, 12.2; N (basic), 3.12; HCl, 16.0.

EXAMPLE 22

A. 3-[3-(4-PHENYL-1-PIPERIDYL)PROPYL]-6-CHLORO-2,4(1H,3H)-QUINAZOLINEDIONE

A mixture of 6-chloroisatoic anhydride (39.5 g., 0.2 mole) and 4-phenyl-1-3-(3-aminopropyl) piperidine (43.6 g., 0.2 mole) and a small amount of dimethylformamide was heated on the steam bath for two hours. The solvent was removed in vacuo and the concentrate was dissolved in 250 ml. of hot chlorobenzene. This solution was heated to boiling and phosgene was slowly bubbled into the stirred solution for 2.5 hours. The solid that formed was collected, washed with ether and dried. The solid was suspended in dilute sodium hydroxide and the free base was extracted with chloroform. The solid that separated from the chloroform layer was collected, washed with water and dried. This solid was recrystallized from an aqueous methanol solution, M.P. 198–199.5°, yield 10.2 g. (14.4%).

Analysis.—Calcd. for $C_{22}H_{24}ClN_3O_2$: N, 10.56. Found: N, 10.70.

B. 3-[3-(4-PHENYL-1-PIPERIDYL)PROPYL]-6-CHLORO-2,4(1H,3H)-QUINAZOLINEDIONE MALEATE

The free base (10 g., 0.026 mole) was suspended in methanol and a methanol solution of maleic acid (11.6 g., 0.1 mole) was added with heating. The solution that formed was diluted with ether to give a white solid which was collected and recrystallized from a methanol-ethyl acetate-ether solution, yield 10.3 g. (78%), M.P. 221.5°–222.5° (dec.).

Analysis.—Calcd. for $C_{22}H_{24}ClN_3O_2 \cdot C_4H_4O_4$: C, 60.8; H, 5.45; N, 8.18. Found: C, 61.1; H, 5.94; N, 8.08.

EXAMPLE 23

3-[3-(4-p-Chlorophenyl-1-piperazyl)propyl]-2,4(1H, 3H) quinazolinedione

A. 4-(p-CHLOROPHENYL)-1-[3-(o-AMINOBENZAMIDO)PROPYL]PIPERAZINE

A mixture of isatoic anhydride (32.6 g., 0.2 mole), 4-(p-chlorophenyl)-1-(3-aminopropyl)piperazine (50.6 g., 0.2 mole) and a small amount of dimethylformamide was heated on the steam bath for an hour. Acetone was added and the hot solution was diluted with water to form a white solid. This solid was collected and recrystallized from aqueous dimethylformamide-acetone, yield 64.3 g. (86.3%), M.P. 155.5–156.5°.

Analysis.—Calcd. for $C_{20}H_{25}ClN_4O$: N, 15.0. Found: N, 14.6.

B. 3-[3-(4-p-CHLOROPHENYL-1-PIPERAZYL)PROPYL]-2,4(1H,3H)-QUINAZOLINEDIONE

The 4-(p-chlorophenyl) - 1 - [3-(o-aminobenzamido)-propyl]piperazine (64.3 g., 0.172 mole) was dissolved in 300 ml. of boiling chlorobenzene. Phosgene was slowly bubbled into the hot stirred solution for 2.5 hours. The solid that formed on cooling was collected, washed with ether and dried. This solid was suspended in water and made basic with concentrated ammonium hydroxide. The free base was extracted with chloroform. The solvent was removed in vacuo and the solid concentrate was recrystallized twice from aqueous dimethylformamide-acetone and once more from acetone-dimethylformamide, yield 12 g. (17.5%), M.P. 228.5–230.0°.

Analysis.—Calcd. for $C_{21}H_{23}ClN_4O_2$: N, 14.1. Found: N, 13.8.

C. 3-[3-(4-p-CHLOROPHENYL-1-PIPERAZYL)PROPYL]-2,4(1H,3H)-QUINAZOLINEDIONE MALEATE

A mixture of the free base (11.5 g., 0.029 mole) and maleic acid (10 g., 0.086 mole) in methanol was heated until a solution was formed. The solution was filtered and diluted with ether to form a white solid. This solid was collected and recrystallized from a methanol-ether solution, yield 13.2 g. (88.7%), M.P. 195–197° (dec.).

Analysis.—Calcd. for $C_{21}H_{23}ClN_4O_2 \cdot C_4H_4O_4$: N, 10.9; N (basic), 2.72. Found: N, 10.7; N (basic), 2.73.

EXAMPLE 24

A. 3-[3-(4-p-CHLOROPHENYL-1-PIPERAZYL)PROPYL]-6-CHLORO-2,4(1H,3H)-QUINAZOLINEDIONE

To 24.6 g. (0.1 mole) of 4-p-chlorophenyl-1-(3-aminopropyl)piperazine was added 22.4 g. (0.1 mole) of 6-chloroisatoic anhydride. The mixture was heated for two hours in a wax bath at 180–200°. The melt was then cooled and methanol was added to the mixture. A solid was obtained which was filtered and dried. Without any further purification the material was dissolved in hot chlorobenzene and phosgene was bubbled into the reaction mixture for two hours while the solution was refluxing and being stirred. A solid precipitated while the reaction was still hot. The material was filtered and treated with a mixture of chloroform and ammonium hydroxide. A solid free base was obtained which was filtered and dried. The free base was recrystallized twice from aqueous DMF, yield 25 g., M.P. 259–262°.

Analysis.—Calcd. for $C_{21}H_{22}Cl_2N_4O_2$: N (basic), 3.24. Found: N (basic), 3.25.

B. 3-[3-(4-p-CHLOROPHENYL-1-PIPERAZYL)PROPYL]-6-CHLORO-2,4(1H,3H)-QUINAZOLINEDIONE MALEATE

The maleate salt was prepared by suspending 25 g. (0.057 mole) of the free base in methanol and adding 6.6 g. (0.057 mole) of maleic acid. The solution was heated on the steam bath for fifteen minutes. A white solid was obtained which was filtered and recrystallized from an aqueous methanol-ether mixture twice, yield 12.0 g., M.P. 203–205°.

Analysis.—Calcd. for $C_{25}H_{26}Cl_2N_4O_6$: N (basic), 2.55; N (total), 10.21. Found: N (basic), 2.50; N (total), 10.01.

EXAMPLE 25

A. 3-[3-(4-m-CHLOROPHENYL-1-PIPERAZYL)PROPYL]-6-CHLORO-2,4(1H,3H)-QUINAZOLINEDIONE

A solution of 23.7 g. (0.12 mole) of 6-chloroisatoic anhydride and 30 g. (0.12 mole) of 4-m-chlorophenyl-1-(3-aminopropyl)piperazine in DMF was heated on the steam bath for thirty minutes. The reaction mixture was then cooled and diluted with water. A solid was obtained which was filtered and dried. Without any further purification the material was dissolved in hot chlorobenzene and phosgene was bubbled into the reaction mixture for two hours while the mixture was refluxing and being stirred. The solution was then cooled and a precipitate was obtained which was filtered and treated with a solution of chloroform and ammonium hydroxide. The choloroform layer was removed and evaporated in vacuo. A solid was obtained which was recrystallized twice from a chloroform-methanol solution, yield 17.6 g., M.P. 198–199°.

Analysis.—Calcd. for $C_{21}H_{22}Cl_2N_4O_2$: N(basic), 3.24. Found: N(basic), 3.21.

B. 3-[3-(4-m-CHLOROPHENYL-1-PIPERAZYL)PROPYL]-6-CHLORO-2,4(1H,3H)-QUINAZOLINEDIONE MALEATE

The maleate salt was prepared by dissolving 17.6 g. (0.04 mole) of the free base in methanol and adding 4.64 g. (0.04 mole) of maleic acid. After heating the mixture on the steam bath for a few minutes, the salt precipitated from the solution. It was filtered and recrystallized twice from an aqueous methanol solution, yield 14 g., M.P. 223–225°.

Analysis.—Calcd. for $C_{25}H_{26}Cl_2N_4O_6$: N(basic), 2.55; N(total), 10.21. Found: N(basic), 2.50; N(total), 10.25.

EXAMPLE 26

A. 3-[4-(4-PHENYL-1-PIPERAZYL)BUTYL]-6-CHLORO-2,4-(1H,3H)-QUINAZOLINEDIONE

To 30 g. (0.13 mole) of 4-phenyl-1-(4-aminobutyl)piperazine in 100 ml. of DMF was added 25.7 g. (0.13 mole) of 6-chloroisatoic anhydride and the mixture was heated on the steam bath for thirty minutes. Water was then added and a precipitate was obtained which was filtered and dried. The solid was then dissolved in hot chlorobenzene and phosgene was bubbled into the mixture for one hour while the solution was refluxing and being stirred. After cooling the solution a solid was obtained which was filtered and then treated with a chloroform-ammonium hydroxide mixture to obtain the free base which was recrystallized from a chloroform-ether mixture twice, yield 33 g., M.P. 205–210°.

Analysis.—Calcd. for $C_{22}H_{25}ClN_4O_2$: N(basic), 3.40. Found: N(basic), 3.66.

B. 3-[4-(4-PHENYL-1-PIPERAZYL)BUTYL]-6-CHLORO-2,4(1H,3H)-QUINAZOLINEDIONE MALEATE

The maleate salt was prepared by suspending 33 g. (0.08 mole) of the free base in methanol and adding 9.28 g. (0.08 mole) of maleic acid. The mixture was heated for fifteen minutes and a precipitate was obtained which was filtered and recrystallized from a methanol-chloroform-ether mixture, yield 15 g., M.P. 220–222°.

Analysis.—Calcd. for $C_{26}H_{29}ClN_4O_6$: N(basic), 2.65; N(total), 10.59. Found: N(basic), 2.69; N(total), 10.39.

EXAMPLE 27

A. 3-[2-(4-PHENYL-1-PIPERAZYL)ETHYL]-6-CHLORO-2,4(1H,3H)-QUINAZOLINEDIONE

To 17.9 g. (0.09 mole) of 4-phenyl-1-(2-aminoethyl)piperazine in approximately 150 ml. of DMF was added 17.8 g. (0.09 mole) of 6-chloroisatoic anhydride and the mixture was heated on the steam bath for thirty minutes. Water was then added to precipitate the amide which was filtered and dried. The crude amide was dissolved into hot chlorobenzene and phosgene was bubbled into the mixture for one hour while the solution was refluxing and being stirred. After cooling the reaction mixture a solid was obtained which was filtered and treated with a mixture of chloroform and ammonium hydroxide to obtain the free base. The layers were separated and the chloroform was evaporated in vacuo. The residue which was obtained was recrystallized from methanol three times, yield 18 g., M.P. 251–253°.

Analysis.—Calcd. for $C_{20}H_{21}ClN_4O_2$: N(basic), 3.64. Found: N(basic), 3.64.

B. 3-[2-(4-PHENYL-1-PIPERAZYL)ETHYL]-6-CHLORO-2,4(1H,3H)-QUINAZOLINEDIONE MALEATE

The maleate salt was prepared by suspending 18 g. (0.46 mole) of the free base in methanol and adding 5.3 g. (0.046 mole) of maleic acid. The salt precipitated almost immediately and was recrystallized from a methanol-chloroform-ether mixture three times, yield 8.5 g., M.P. 230–231°.

*Analysis.*—Calcd. for $C_{24}H_{25}ClN_4O_6$: N(total), 11.39; N(basic), 2.80. Found: N(total), 11.19, N(basic), 2.86.

EXAMPLE 28

A. 3-(3-MORPHOLINOPROPYL)-6-CHLORO-2,4(1H,3H)-QUINAZOLINEDIONE

To 30 g. (0.21 mole) of N-(3-aminopropyl)morpholine in approximately 100 ml. of DMF was added 41.5 g. (0.21 mole) of 6-chloroisatoic anhydride. The mixture was heated for thirty minutes on the steam bath. Water was added to precipitate the amide. The solid was filtered and dried. The crude material was then dissolved in hot chlorobenzene and phosgene was bubbled into the reaction mixture for one hour while the solution was refluxing and being stirred. After cooling the mixture a solid was obtained which was filtered and treated with a chloroform-ammonium hydroxide mixture. The chloroform layer was removed and the chloroform evaporated in vacuo. The residue was recrystallized from a chloroform-ether mixture three times, yield 41 g. M.P. 173–174°.

*Analysis.*—Calcd. for $C_{15}H_{18}ClN_3O_3$: N(basic), 4.34. Found: N(basic), 4.33.

B. 3-(3-MORPHOLINOPROPYL)-6-CHLORO-2,4(1H,3H)-QUINAZOLINEDIONE MALEATE

The maleate salt was prepared by suspending the 41 g. (0.135 mole) of free base in methanol and adding 15.6 g. (0.135 mole) of maleic acid. The mixture was heated for a few minutes on the steam bath and after cooling a precipitate was obtained which was filtered and recrystallized from a methanol-ether mixture three times, yield 25 g., M.P. 181–184°.

*Analysis.*—Calcd. for $C_{19}H_{22}ClN_3O_7$: N (total), 9.57; N (basic), 319. Found: N (total), 9.55; N (basic) 3.23.

EXAMPLE 29

A. 3-[2-(4-m-CHLOROPHENYL-1-PIPERAZYL)ETHYL]-6-CHLORO-2,4(1H,3H)-QUINAZOLINEDIONE

To 23.7 g. (0.12 mole) of 6-chloroisatoic anhydride was added 25 g. (0.12 mole) of 4-m-chlorophenyl-1-2(2-aminoethyl)piperazine in 150 ml. of DMF. The mixture was heated on the steam bath for 30 minutes and water was then added to precipitate the amide. The amide was filtered and dried and then without any further purification dissolved in hot chlorobenbene. Phosgene was bubbled into the mixture while the solution was refluxing and being stirred for 2 hours. A brown oily residue separated while the mixture was still hot. Upon cooling the oil solidified and was filtered by suction. The solid was treated with a solution of chloroform and ammonium hydroxide to obtain the free base. The chloroform layer was separated and the chloroform was evaporated in vacuo. A residue was isolated which was recrystallized three times from a methanol-DMF-water mixture, yield 9.0 g., M.P. 228–230°.

*Analysis.*—Calcd. for $C_{20}H_{20}Cl_2N_4O_2$: N (basic), 3.34. Found: N (basic), 3.36.

B. 3-[2-(4-m-CHLOROPHENYL-1-PIPERAZYL)ETHYL]-6-CHLORO-2,4(1H,3H)-QUINAZOLINEDIONE MALEATE

The maleate salt was prepared by suspending the free base in methanol and adding 2.5 g. (0.021 mole) of maleic acid. The mixture was heated on the steam bath for 15 minutes. A solid was obtained which was filtered and recrystallized twice with charcoal from a methanol-DMF-ether mixture, M.P. 220–222°.

*Analysis.*—Calcd. for $C_{24}H_{24}Cl_2N_4O_6$: N (basic), 2.26; N (total), 10.46. Found: N (basic), 2.65; N (total), 10.28.

EXAMPLE 30

3-[4-(4-m-chlorophenyl-1-piperazyl)butyl]-2,4(1H,3H)-quinazolinedione hydrochloride A mixture of 1-(4-aminobutyl)-4-m-chlorophenylpiperazine (53.5 g., 0.2 mole) and isatoic anhydride (32.6 g., 0.2 mole) was heated on a steam bath overnight after the initial reaction had subsided. The amber syrup was dissolved in 250 ml. of chlorozenzene. A slow stream of phosgene was bubbled in during a 60 minute period at the boiling point of the solvent to give a tan solid which came out from the hot reaction mixture. It was cooled in an ice-water bath and the solid was collected by suction, washed with ethyl acetate and dried in vacuo in a desiccator, yield 132.2 g., M.P. 230–238° (dec.) It was once recrystallized from aqueous methanol-ethyl acetate to give a crystalline solid of M.P. 243–245°, yield 51.2 g.

$\nu_{max.}^{KCl}$ 1710 and 1660 cm.$^{-1}$ (illide carbonyls), no amide II band.

*Analysis.*—Calcd. for $C_{22}H_{26}Cl_2N_4O_2$: N, 12.5; HCl, 8.13. Found: N, 12.2; HCl, 8.12.

EXAMPLE 31

3-[3-(4-phenyl-1-piperazyl)propyl]-6-nitro-2,4(1H,3H)-quinazolinedione

A. N-[3-(4-PHENYL-1-PIPERAZYL)PROPYL]-N'-(2-CARBOXY-4-NITROPHENYL)UREA

A mixture of 1-(3-aminopropyl)-4-phenylpiperazine (70.9 g., 0.325 mole) and 6-nitroisatoic anhydride (67.5 g., 0.325 mole) was heated on a steam bath for an hour after the initial reaction had subsided to give a dark yellow solid mass. It was dissolved in hot DMF, treated with carbon, filtered and diluted with acetone and a large excess of ether to give 13.4 g. (9.7%) of a light yellow solid of M.P. 242° (dec.). It was N-[3-(4-phenyl-1-piperazyl)propyl]-N'-(2-carboxy-4-nitrophenyl)urea.

*Analysis.*—Calcd. for $C_{21}H_{25}N_5O_5$: C, 59.0; H, 5.85; N, 16.4. Found: C, 58.8; H, 5.76; N, 16.5.

B. 1-[3-(2'-AMINO-5'-NITROBENZAMIDO)PROPYL]-4-PHENYLPIPERAZINE

The filtrate was concentrated by heating on a hot plate and excess water was added to give a dark oil which slowly solidified on scratching. The yield was 97.0 g., (77.8%) M.P. 143–145° with softening at 138°. It was dissolved in hot DMF and added to a large excess of water to give a yellow powder of M.P. 140–144°. It was again recrystallized to give an analytical sample of M.P. 141–144°.

$\nu_{max.}^{CHCl_3}$ 3500 and 3330 cm.$^{-1}$ ($NH_2$ and NH), 1645 cm.$^{-1}$ (amide carbonyl), 1550 cm.$^{-1}$ (amide II), 1505 and 1330 cm.$^{-1}$ ($NO_2$).

*Analysis.*—Calcd for $C_{20}H_{25}N_5O_3$: N, 18.30; (N (basic), 3.66. Found: N, 18.23; N, (basic), 3.60.

C. 3-[3-(4-PHENYL-1-PIPERAZYL)PROPYL]-6-NITRO-2,4(1H,3H)-QUINAZOLINEDIONE

*Method 1:* To a boiling solution of 1-[3-(2'-amino-5'-nitrobenzamido)-propyl]-4-phenylpiperazine (95.2 g., 0.249 mole) from B in 400 ml. of chlorobenzene was bubbled in a slow stream of phosgene during a 90 minute period to give a tan solid. The reaction mixture was kept at room temperature overnight and the solid was collected on a filter, yield 112.5 g., M.P. 245–250° (dec.) with softening at 210°. It was suspended in water and made basic with aqueous ammonia to give a yellowish brown solid, yield 99.1 g., M.P. 170–219° with softening at 120°. It was recrystallized twice from aqueous methanol-DMF to give a deep yellow solid of M.P. 208–210°, yield 50.0 g., $\nu_{max}^{CHCl_3}$ 1725 and 1670 cm.$^{-1}$ (imide carbonyls), 1540 and 1340 cm.$^{-1}$ (NO$_2$).

*Analysis.*—Calcd. for C$_{21}$H$_{23}$N$_5$O$_4$: N, 17.14. Found: N, 17.26.

*Method 2:* N-[3-(4-phenyl-1-piperazyl)propyl]-N'-(2-carboxy-4-nitrophenyl)urea from A (13.4 g.) was recrystallized twice from aqueous DMF-methanol to give a yellow solid of M.P. 208–210°, yield 8.0 g. Mixed M.P. with the product by method 1 was not depressed. The I.R. spectra were identical.

*Analysis.*—Calcd. for C$_{21}$H$_{23}$N$_5$O$_4$: N, 17.14. Found: N, 17.07.

N - [3 - (4 - phenyl - 1 - piperazyl)propyl] - N' - (2-carboxy-4-nitrophenyl)-urea, isolated in Example 31 as a by-product of the reaction between 6-nitroisatoic anhydride and 1-(3-aminopropyl)-4-phenylpiperazine, provides another useful synthetic route to the novel quinazolinediones of this invention. As shown in the example heating of the corresponding urea derivative with elimination of water produces the quinazolinedione in good yield.

EXAMPLE 32

*3-[3-(4-phenyl-1-piperazyl)propyl]-6-acetamido-2,4-(1H,3H)-quinazolinedione*

A. 3-[3-(4-PHENYL-1-PIPERAZYL)PROPYL]-6-AMINO-2,4(1H,3H)-QUINAZOLINEDIONE

3 - [3 - (4 - phenyl - 1 - piperazyl)propyl] - 6 - nitro-2,4(1H,3H)-quinazolinedione (50.0 g., 0.123 mole), the compound of Example 31, was hydrogenated with 10 g. of palladium on charcoal (5% by weight) in 400 ml. of glacial acetic acid under 50 lb. of initial hydrogen pressure at room temperature. The calculated amount of hydrogen was taken up in 30 min. The catalyst was removed and the solvent was evaporated off in vacuo to leave a brown viscous syrup which was treated with liquid ammonia to give a solid of M.P. 229–235°, yield 46.9 g. It was once recrystallized from aqueous methanol-DMF (carbon) to give a brown powder of M.P. 234–238°, yield 37.9 g. The amino derivative is unstable in air and the salt became dark during purification.

B. 3-[3-(4-PHENYL-1-PIPERAZYL)PROPYL]-6-ACETAMIDO-2,4(1H,3H)-QUINAZOLINEDIONE MALEATE

The above amino derivative (30.2 g.) was hydrogenated again in a mixture of glacial acetic acid (200 ml.) and acetic anhydride (50 ml.) with 5 g. of palladium on carbon (5% by weight) to reduce any oxidized material. The product was obtained as described above; yield 27.2 g., M.P. 258–262° (softening at 252°). It was recrystalized from aqueous methanol-DMF to give a tan powder of M.P. 257–261° (dec.), yield 18.1 g. It was suspended in methanol and maleic acid (5.8 g., 0.05 mole) was added to give a slurry which was dissolved in aqueous methanol-DMF, treated with charcoal and concentrated. It was boiled down with ethyl acetate to give a pure maleate of M.P. 245–246° (dec.), yield 19.7 g.

$\nu_{max}^{KCl}$ 1710 and 1650 cm.$^{-1}$ (imide carbonyls), 1650 cm.$^{-1}$ (AcNH).

*Analysis.*—Calcd. for C$_{23}$H$_{27}$N$_5$O$_3$·C$_4$H$_4$O$_4$: C, 60.3; H, 5.77; N, 13.0. Found: C, 60.0; H, 5.56; N, 13.0.

EXAMPLE 33

*3-[2-(4-m-chlorophenyl-1-piperazyl)ethyl]-2,4-(1H,3H)-quinazolinedione*

A. 4-m-CHLOROPHENYL-1-[2-(o-AMINOBENZAMIDO)ETHYL]PIPERAZINE

A mixture of isatoic anhydride (32.6 g., 0.2 mole), 4-m-chlorophenyl-1-(2-aminoethyl)piperazine (47.9 g., 0.2 mole) and a small amount of dimethylformamide was heated on the steam bath for one hour. The reaction product was dissolved in hot acetone and diluted with water to form a solid, which was collected and recrystallized from an aqueous acetone solution, yield 40 g. (55.8%), M.P. 125.5–126.5°.

*Analysis.*—Calcd. for C$_{19}$H$_{23}$ClN$_4$O: N, 15.62. Found: N, 16.08.

B. 3-[2-(4-m-CHLOROPHENYL-1-PIPERAZYL)ETHYL]-2,4(1H,3H)-QUINAZOLINEDIONE

A suspension of 4-m-chlorophenyl-1-[2-(o-aminobenzamido)-ethyl]piperazine (40 g., 0.111 mole) in 200 ml. of chlorobenzene was heated to boiling and phosgene was slowly bubbled into the solution for 45 minutes. The solid that formed was collected, washed with ether and dried. The solid was shaken in chloroform and ammonium hydroxide solution and the chloroform layer was collected and concentrated in vacuo to a solid. This solid was twice recrystallized from an aqueous DMF-acetone solution, yield, 13 g. (30.5%), M.P. 212.5–214.5°.

*Analysis.*—Calcd. for C$_{20}$H$_{21}$ClN$_4$O$_2$: N, 14.56. Found: N, 14.54.

C. 3-[2-(4-m-CHLOROPHENYL-1-PIPERAZYL)ETHYL]-2,4-(1H,3H)-QUINAZOLINEDIONE MALEATE

A suspension of this free base (13 g., 0.034 mole) and maleic acid (8 g., 0.07 mole) in methanol were heated to form a solution that immediately solidified. Water was added and the hot solution was filtered. The filtrate was diluted with ether and cooled to form a crystalline solid. This solid was collected, washed with ether and dried, yield, 12.5 g. (74%), M.P. 210.5–211.5° (dec.).

*Analysis.*—Calcd. for C$_{20}$H$_{21}$ClN$_4$O$_2$·C$_4$H$_4$O$_4$: N, 11.19; N (basic), 2.80. Found: N, 11.25; N (basic), 2.89.

In summary this invention provides a series of novel quinazolinediones which have useful sedative and anti-inflammatory properties and convenient methods for their preparation. These compounds correspond to the general formula:

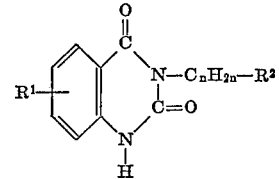

wherein R$^1$ represents one or more groups such as hydrogen, halogen, lower alkyl, lower alkoxy, nitro and amino including acylamino; $n$ equals 0 to 6 inclusive; and R$^2$ represents di-lower alkylamino or a heterocyclic radical such as piperazyl, pyridyl, piperidyl, piperazinium, morpholinyl, benzodiazepinyl and various substituted derivatives of these and other nitrogen containing heterocycles. A preferred sub-group of these compounds includes di-lower alkylamino, piperazyl, phenyl substituted piperazyl, substituted-phenyl substituted piperazyl, phenalkyl substituted piperazyl, pyridyl, piperadyl, phenyl substituted piperidyl, piperazinium, phenyl substituted piperazinium, substituted-phenyl substituted piperazinium, morpholinyl, benzodiazepinyl and substituted benzodiazepinyl. The various substituents may be those listed for R$^1$ and may also include any other radical commonly encountered in organic chemistry. An especially preferred sub-group of such compounds are those which contain the piperazyl radical.

These compounds are usually provided in the form of their salts for reasons of stability and solubility. Especially important are those salts such as the hydrochloride and maleate and other pharmacologically acceptable salts.

What is claimed is:
1. A compound selected from the group consisting of a compound of the formula

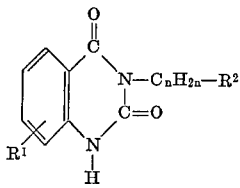

wherein $R_1$ is a member selected from the group consisting of hydrogen, chloro, nitro and lower alkanoyl amino; $n$ is a number from 0 to 6 inclusive; and $R_2$ is a member selected from the group consisting of piperazyl, 4-phenyl-1-piperazyl; 4-(chlorophenyl)-1 piperazyl; 4-phenyl lower alkyl -1-piperazyl; pyridyl; 1-piperidyl; 4-phenyl-1-piperidyl; piperazinium methosulfate; 4-phenyl piperazinium methosulfate; 4-phenyl-1 lower alkyl-1-piperazinium methosulfate; 4-chlorophenyl-1 lower alkyl-1-piperazinium; morpholino; 2,3,4,5-tetrahydro 1,4(1H)benzodiazepin-4-yl; and 2,3,4,5-tetrahydro-1 lower alkyl-1, 4(1H)benzodiazepin-4-yl; and pharmacologically acceptable acid additions salts thereof.

2. 3[2-(4-phenyl-1-piperazy)ethyl]-2,4(1H, 3H)-quinazolinedione.

3. 3 - [3 - (4-phenyl-1-piperazyl)ethyl]-2,4(1H, 3H)-quinazolinedione.

4. 3 - [5 - (4-phenyl-1-piperazyl)penty]-2,4(1H, 3H)-quinazolinedione.

5. 3 - [3 - (4-m-chlorophenyl-1-piperazyl)propyl]-2,4-(1H, 3H)-quinazolinedione.

6. 3 - [2 - (4 - m-chlorophenyl-1-piperazyl)ethyl]-2,4(1H, 3H)-quinazolinedione.

References Cited by the Examiner

UNITED STATES PATENTS

| | | | |
|---|---|---|---|
| 2,680,741 | 6/1954 | Gilbert | 260—260 |
| 2,688,020 | 8/1954 | MacKay et al. | 260—260 |
| 3,095,443 | 6/1963 | Cavallini et al. | 260—471 |
| 3,096,373 | 7/1963 | Kirchner | 260—558 |
| 3,118,930 | 1/1964 | Sisido et al. | 260—471 |
| 3,161,678 | 12/1964 | Thominet | 260—558 |

OTHER REFERENCES

Burger: Medicinal Chemistry, 2nd ed., New York, Interscience Publishers, Inc., 1960, p. 42.

Elderfield: Heterocyclic Compounds, vol. 6, New York, John Wiley and Sons, Inc., 1957, p. 347.

Kunckell: Berichte, vol. 43, 1910, pp. 1021–1024.

ALEX MAZEL, *Primary Examiner.*

NICHOLAS S. RIZZO, HENRY R. JILES, *Examiners.*

J. W. ADAMS, M. O'BRIEN, *Assistant Examiners.*

UNITED STATES PATENT OFFICE
CERTIFICATE OF CORRECTION

Patent No. 3,274,194                                  September 20, 1966

Shin Hayao

It is hereby certified that error appears in the above numbered patent requiring correction and that the said Letters Patent should read as corrected below.

Column 3, line 5, for "wits" read -- with --; column 4, line 68, for "33330 cm.$^{-1}$" read -- 3330 cm.$^{-1}$ --; column 9, line 31, for "4.72; MCl," read -- 4.72; HCl, --; column 13, line 23, for "1-METHLY" read -- 1-METHYL --; column 13, line 68, after "heated" insert -- at 70° for 2 hours. Then 6.5 g. (0.1 mole) of potassium cyanide was added and the mixture was heated at 70° for --; lines 70 and 71, strike out "at 70° for 2 hours. Then 6.5 g. (0.1 mole) of potassium cyanide was added and the mixture was heated at 70° for" --; column 17, line 47, for "4-m-chlorophenyl-1-2(2-" read -- 4-m-chlorophenyl-1-(2- --; column 18, line 21, for "(illide carbonyls)" read -- (imide carbonyls) --; line 61, for "18.30; (N" read -- 18.30; N --; line 74, for "M.P. 170-219°" read -- M.P. 170-210° --.

Signed and sealed this 29th day of August 1967.

(SEAL)
Attest:

ERNEST W. SWIDER                             EDWARD J. BRENNER
Attesting Officer                             Commissioner of Patents